(12) United States Patent
Bourgault

(10) Patent No.: US 6,216,616 B1
(45) Date of Patent: Apr. 17, 2001

(54) MID ROW BANDING COULTER DRILL

(75) Inventor: Gerard F. J. Bourgault, St. Brieux (CA)

(73) Assignee: Bourgault Industries Ltd. (CA)

( * ) Notice: Subject to any disclaimer, the term of this patent is extended or adjusted under 35 U.S.C. 154(b) by 0 days.

(21) Appl. No.: 09/356,667

(22) Filed: Jul. 19, 1999

(30) Foreign Application Priority Data

Jun. 7, 1999 (CA) .................................................. 2274484

(51) Int. Cl.$^7$ ....................................................... A01C 7/00
(52) U.S. Cl. ............................ 111/186; 111/192; 111/194
(58) Field of Search .................................. 111/186, 194, 111/192

(56) References Cited

U.S. PATENT DOCUMENTS

| | | | |
|---|---|---|---|
| 2,691,353 | 10/1954 | Secondo | 111/52 |
| 4,031,834 | 6/1977 | Klenke | 111/85 |
| 4,090,456 | 5/1978 | Morrison, Jr. et al. | 111/3 |
| 4,196,679 | 4/1980 | Moore | 111/85 |
| 4,570,554 | 2/1986 | Clark | 111/85 |
| 4,611,545 | 9/1986 | Nickeson et al. | 111/52 |
| 4,653,410 | 3/1987 | Typpi | 111/1 |
| 4,700,641 | 10/1987 | Head, Jr. et al. | 111/85 |

(List continued on next page.)

FOREIGN PATENT DOCUMENTS

| | | |
|---|---|---|
| 1 089 720 | 11/1980 | (CA) . |
| 1 121 218 | 4/1982 | (CA) . |
| 1 145 618 | 5/1983 | (CA) . |
| 1 158 102 | 12/1983 | (CA) . |
| 2073370 | 7/1992 | (CA) . |
| 2221388 | 5/1995 | (CA) . |
| 2212388 | 2/1999 | (CA) . |

OTHER PUBLICATIONS

John Deere—Drills, Seeder and Seeding Tiller brochure, p. 11, Date Unknown.
John Deere—Drills and Seeders brochure, pp. 5, 7, and 16, Date Unknown.
Great Plains—Solid Stand® 3 Point Drills & No–Till Hitches brochure, Date Unknown.
Date Plains—Solid Stand Folding No–Till Drill—New Product Bulletin, Date Unknown.
John Deere Agricultural Equipment—No–Till Air Drill website pages (Oct. 16, 1999).
Flexi–Coil Dryland: 6000 No–Till Air Drill (Ultra Low Disturbance) webside pages (Oct. 16, 1999).

Primary Examiner—Christopher J. Novosad
(74) Attorney, Agent, or Firm—Michael Best & Friedrich LLP

(57) ABSTRACT

A coulter closing wheel assembly, a method of planting, and a mid row banding pneumatic coulter drill assembly support vehicle. One fertilizer coulter is positioned between two seeding coulters. The seeding coulters are followed by a furrow closing disc which scrubs the ground and pushes soil back into the furrow. The seeding coulters are also followed directly by a packer wheel. The fertilizer coulters may or may not employ a furrow closing disc, depending on the type of fertilizer and the type of soil. In the event of granular or liquid nitrogen fertilizers the closing disc is generally not necessary. However, when a gaseous fertilizer such as anhydrous ammonia is applied to the soil, the furrow closing disc is necessary in order to prevent the escape of the anhydrous ammonia into the atmosphere. The coulters are firmly attached to horizontal frame members of the drill and placed at an angle of a few degrees off the direction of travel. The injection of fertilizer directly between a pair of seed rows ensures a steady supply of nitrogen or other fertilizers throughout the growing period. In addition, since the fertilizer is placed a fair distance from each of the seed rows, it will not scorch or burn the roots of the growing crop.

24 Claims, 9 Drawing Sheets

U.S. PATENT DOCUMENTS

| | | | |
|---|---|---|---|
| 4,714,033 | 12/1987 | Neumeyer | 111/85 |
| 4,760,806 | 8/1988 | Bigbee et al. | 111/87 |
| 4,796,550 | 1/1989 | Van Natta et al. | 111/87 |
| 4,883,126 | 11/1989 | Leland | 172/26 |
| 5,357,884 | 10/1994 | Bourgault | 111/186 |
| 5,595,130 | 1/1997 | Baugher et al. | 111/52 |
| 5,619,939 | 4/1997 | Herman et al. | 111/163 |
| 5,809,915 | 9/1998 | Jess et al. | 111/69 |

MID ROW BANDING COULTER DRILL

FIELD OF INVENTION

This invention relates to agricultural seeding implements and more particularly, to a mid row banding pneumatic coulter drill and a method of fertilizing and seeding the crop in a single pass.

BACKGROUND

Farming in many parts of the dry land wheat growing areas of the world, especially in more technically advanced regions, is moving towards less and less tillage prior to seeding. Seeding directly into untilled fields is becoming quite common and gaining in popularity as our implements can ensure seed and nitrogen fertilizer separation while seeding.

There are many benefits from reducing tillage prior to seeding including reduced soil erosion, better moisture conservation and reduced weed growth. This results in reduced operating cost, better seed germination and crop establishment.

Seeding implements which can apply seed and fertilizer in one pass are gaining in popularity, particularly due to the high cost of labour in farming. Examples of such implements include air hoe drills and cultivators with dual shoot boots and air hoe drills and cultivators with mid row fertilizer banding coulters. A challenge for farm equipment designers is to create machines that are capable of placing any and all of the necessary crop production agents, i.e. generally seed and fertilizer but also possibly seed and fertilizer coatings, into the soil while not adversely affecting the opportunity for good crop germination, emergence and establishment. A highly desirable characteristic of the equipment that performs the placement of the products of good crop production is minimal soil disturbance. Another is precise seed placement. A third is good covering of the seed with soil prior to packing. Yet another is adequate compaction of the soil around the seed to ensure good seed to soil contact.

Present day seeding implements generally have two types of ground opening systems. These are hoe or disk systems. Some seeding units combine both systems.

A multitude of coulter disk equipped seeding implements have been manufactured that can adequately perform the seeding function in certain soil conditions. However, many have failed to perform adequately over a wide range of soil conditions. Some are expensive to purchase, onerous to maintain and very time consuming to adjust for different soil penetration depths. Thus, there is a need to provide an implement which includes a combination of elements, proven effective in producing good crop emergence and establishment in a broad range of conditions with low soil disturbance. It is also an object of the present invention to provide a device which is less expensive to produce and more operator friendly to both operate and maintain.

SUMMARY OF THE INVENTION

The implement of the present invention is attached to an air seeder cart with at least one hopper bin but more often has a multitude of hopper bins that contain at least seed and fertilizer. The air seeder cart may contain seed or fertilizer that has previously been treated or coated with an agent or variety of agents. The seeding implement can also have directly, or indirectly attached to it a liquid fertilizer container or pressure vessel containing anhydrous ammonia.

In the method of seeding and fertilizing carried out by the present invention, the contents of the liquid fertilizer or anhydrous ammonia is directed to fertilizer depositing coulters located mid-way between the seed coulters.

The seed rows created are directly in line with packer wheels, whereas the fertilizer coulters are generally midway between the seed coulters and are not followed by packer wheels. Fertilizer depositing coulters are generally set to penetrate the soil somewhat deeper than the seed depositing coulters, however, this is not always the case. The relationship can vary between soil type, crop type and soil moisture conditions. The coulter disk fertilizer depositing coulters are generally adjustable in height to vary the relationship between the seeding and fertilizing depth. In summary, the implement of the present invention has both seed and fertilizer disk coulter assemblies. The disk coulter assemblies, however, can interchangeably be used for both fertilizer or seed or a combination of the two. However, when only seed is being deposited in a row it should be followed by a furrow closing wheel preferably and then packed.

The implement of the present invention is typically towed over the soil by an agricultural tractor. The disk coulters are fixedly mounted to the horizontal cross bars of the frame of the implement and run in an acute angle to the direction of travel, generally 1° to 50°. The implement frame supporting the disk coulters of the present invention is raised and lowered using at least one hydraulic cylinder by actuation of a hydraulic control located within the tractor cab.

Once the coulters are lowered such that they enter the soil, they create slots or furrows into which are delivered the agents of crop production including at least seed and fertilizer. Packer wheels are aligned in direct registration with the seed depositing coulters. In the case where split wheel packers are used, the centre of the seed row is in registration with the geometric mid point between the pair of packer wheel disks. The split row packer wheels pack the seed by lateral soil compaction. Split wheel packers leave an area on the surface of the soil unpacked to try and ensure that soil crusting will not occur. Soil crusting in clay soils can adversely affect crop emergence.

In one embodiment of the invention, the coulter disk assembly includes a spring loaded scraper which protects a material delivery tube. Once the soil has passed the spring loaded scraper and the material delivery tube, most of the soil tends to fall back into the furrow or slot to cover the material deposited. In the case of the seed disk coulters the soil is packed by packer wheels generally located over the seed row. The fertilizer disk coulter furrows are not packed using packer wheels.

In a preferred embodiment of the present invention, the seed coulters and sometimes the fertilizer coulters, are equipped with a furrow closing wheel. The wheel runs at an acute angle to the direction of travel and is located behind the disk coulter. It's purpose is to push dirt over the furrow. In the case of seed disk coulters, the furrow closing wheels are located between the disk coulters and the packer wheels and push soil over the seed furrow that is subsequently packed by the packer wheel.

In a preferred embodiment, the furrow closing wheel is pivotally attached by an arm to the disk coulter mounting bracket. The furrow closing wheel is located on the side of the disk coulter that pushes the soil to the side. The idea is to push the soil that has been forced out when the furrow is formed back into and over the furrow. If there is any straw that is inadvertently pushed into the furrow by the disk coulter, the soil pushed back over the furrow tends to fill in around the straw and assist the packer wheel to produce good seed to soil contact.

Furrow closing wheels can also be added to the fertilizer coulter assemblies and particularly when anhydrous ammonia is used which in the gaseous form will escape from the furrow if not trapped under the earth.

In another embodiment of the invention, caster wheels are pivotally attached to the front of the frame to provide support to the front of the frame of the implement. The front caster wheel assemblies are also designed to raise the front of the frame so that the disk coulters are no longer in contact with the ground. This is done using hydraulic cylinders, and important for transport.

In the present invention, packer wheels are grouped together in gangs using long shafts, and the packer wheel shafts are pivotally attached to packer frames. Each packer gang frame is pivotally attached to the rear of the frame by pull arms. Typically, two gangs are tied together using a beam and pivotal connections to produce a type of motion in the gangs which in the industry is typically referred to as a "walking beam" motion. The pull arms are also pivotally attached to the frame by mounting brackets, pins, and rubber mounts. The rubber mount not only allows the packer pull arm to move up and down pivoting about an axis that is parallel to the ground and perpendicular to the direction of travel of the implement; but it also provides the packer pull arm with the ability to rotate about its longitudinal axis to pivot about an axis that is perpendicular to the longitudinal axis of the pull arm which intersects the mounting bracket to pull arm attachment axis.

For the sake of providing a more simple explanation regarding motion of the packer pull arm, it could be stated that the rubber connection basically gives a loose fit, ball and socket type of connection at the pull arm to frame attachment bracket connection. When the walking motion of the packer gangs occurs and one packer gang of a pair goes up, the other goes down and the lateral separation between the outboard ends of the packer pull arms reduces as the arms move in an arc. This type of connection allows one gang to raise independently of the other allowing the gangs to better follow the train and climb over obstacles.

The geometry of parallel caster wheel attachment arms and pivot brackets, the motion of the rock shafts and its attaching linkages and the packer frame attachment arm is such that when the implement frame raises or lowers, it always remains substantially parallel to the ground.

In another embodiment of the invention, transport wheels located behind the packer wheels can be used on the centre implement frame and lift the packers out of contact of the ground, for transport. In transport position only do rear transport wheels and front caster wheels contact the ground. Hydraulic cylinders are pivotally attached to the transport wheel carrier assemblies which in turn pivotally connect to the main centre implement frame by a brackets rigidly welded onto the implement frame and as the hydraulic cylinders attached to the rear transport wheel carrier are extended, the transport wheels move down and lift the packer gangs up from the ground.

In summary, the present invention provides a disk coulter seeding implement which is well suited to seeding fields where a majority of the straw residue is left standing in the field. The implement of the present invention is capable of penetrating untilled fields and precisely placing seed and fertilizer into the soil to achieve optimum yields with minimal soil disturbance.

In the present invention the disk seed coulters rotate at an acute angle 1° to 5° to the direction of travel, while the furrow closing wheel which runs substantially behind it, also rotates an acute angle to the direction of travel 1° to 7° but rotates at an opposite angle to the disk.

The furrow closing wheel scrubs the surface of the soil and directs the available soil, generally the soil pushed over the side of the disk coulter back over the furrow. The furrow closing wheel assembly includes a disk rotatably attached to an arm, which is pivotally attached to either the drill frame or the disk coulter assembly to allow following of the soil and raising over obstacles without damage. In a preferred embodiment of the present invention, the furrow closing wheel is pivotally attached to the disk coulter assembly. The packer wheel then runs behind the closer wheel and is in registration with the seed disk coulter.

Different embodiments of the present invention can include a unit with fertilizer coulters between every second pair of seed coulters. In other words there are half as many fertilizer coulters are used as seed coulters; such that the seed can only access the fertilizer row from one direction.

In an alternative embodiment fertilizer coulters are placed between each pair of seed coulters, i.e., one seed row, one fertilizer row, one seed row, one fertilizer row etc. are created. Thus, there are just as many fertilizer coulters as seed coulters and the seed can access a fertilizer row from two opposite directions.

Furrow closing wheels can be used behind seed coulters or both seed and fertilizer coulters. Packer wheels may be either split or single. They have differing profiles and widths with different wheel arrangements. A unit may include one implement frames or multiple frames capable of being folded in various ways through hydraulics.

Therefore this invention seeks to provide a farm implement adapted to deposit seed and fertilizer in soil and be pulled by a power source comprising: a framed cart supported at least by front support wheels and rear packer wheels; said cart including a plurality of horizontal frame members extending perpendicular to the line of travel; a plurality of seed depositing coulter disk assemblies and a plurality of fertilizer depositing coulter disk assemblies mounted on said frame members; each of said fertilizer depositing coulter disk assemblies being mounted mid-way between seed depositing coulter disk assemblies, such that in operation a row of fertilizer is deposited equidistant between two rows of deposited seed.

This invention also seeks to provide a method of seeding and fertilizing a field comprising the steps of: (1)
positioning a plurality of seed depositing and fertilizer depositing coulter disk assemblies along horizontally disposed frame members of a tool bar, such that each fertilizer depositing coulter disk assembly is located mid-way between a pair of seed depositing coulter disk assemblies; (2)
connecting said seed depositing coulter disk assemblies and said fertilizer depositing coulter disk assemblies to a seed container and a fertilizer container on an air seeder cart with a plurality of hoses or tubes; (3) pulling said tool bar forwardly and creating a series of pairs of seeded furrows, each pair of seeded furrows having a single fertilizer furrow mid-way there between; (4) covering each seed furrow with soil with a furrow closing wheel; and (5) packing each seeded furrow with a packer wheel.

This invention further seeks to provide an agricultural disk coulter seeding implement intended to be towed behind an agricultural tractor across agricultural fields including: a) a hitch; b) said hitch attached to a lattice type frame; c) wheels for supporting said lattice frame; d) hydraulic means for changing the height above the ground of said lattice frame; e) seed disk coulter assemblies rigidly attached to said lattice frame and primarily used for receiving and depositing seed; f) fertilizer disk coulter assembly rigidly attached to said lattice frame and primarily used for receiving and depositing fertilizer; g) said seed disk coulter assemblies creating furrows in the soil for allowing the entry of seed into the soil; h) closer wheels located behind said seed disk coulter assemblies used to push soil over said seed furrows; i) packer wheels located behind said seed disk coulter assemblies and also behind said closer wheels located behind said seed disk coulter disk assemblies; j) means for supplying seed to said seed disk coulter assemblies; k) means for supplying fertilizer to said fertilizer disk coulter assemblies.

BRIEF DESCRIPTION OF THE DRAWINGS

The invention will be more clearly described in connection with the following drawings wherein:

In FIG. 1, a coulter drill is shown generally as 1. Attached to the coulter drill are fertilizer coulter assemblies 2 and seed coulter assemblies 3. Generally a series of packer wheels 4 are adapted to follow the furrows made by the seed coulters 3. The implement is supported by front castering wheels 6. Rear ground engaging wheels 5 can be lowered for transport purposes. Packer wheels 4 are sufficient to support the implement during the seeding operation. However, when transport is necessary, both front castering wheels 6 and rear ground supporting wheels 5 are necessary. Both front castering wheels 6 and rear ground engaging wheels 5 are adapted, by known hydraulics, to raise or lower the frame of the implement. Coulter disk assemblies 2 and 3 are attached to the implement on horizontal cross members shown as 7. Seed and fertilizer are carried to the seed boots (not marked in FIG. 1) of coulter disk assemblies 2 and 3 through manifolds 8 and 9 in a known manner.

Figure 1:
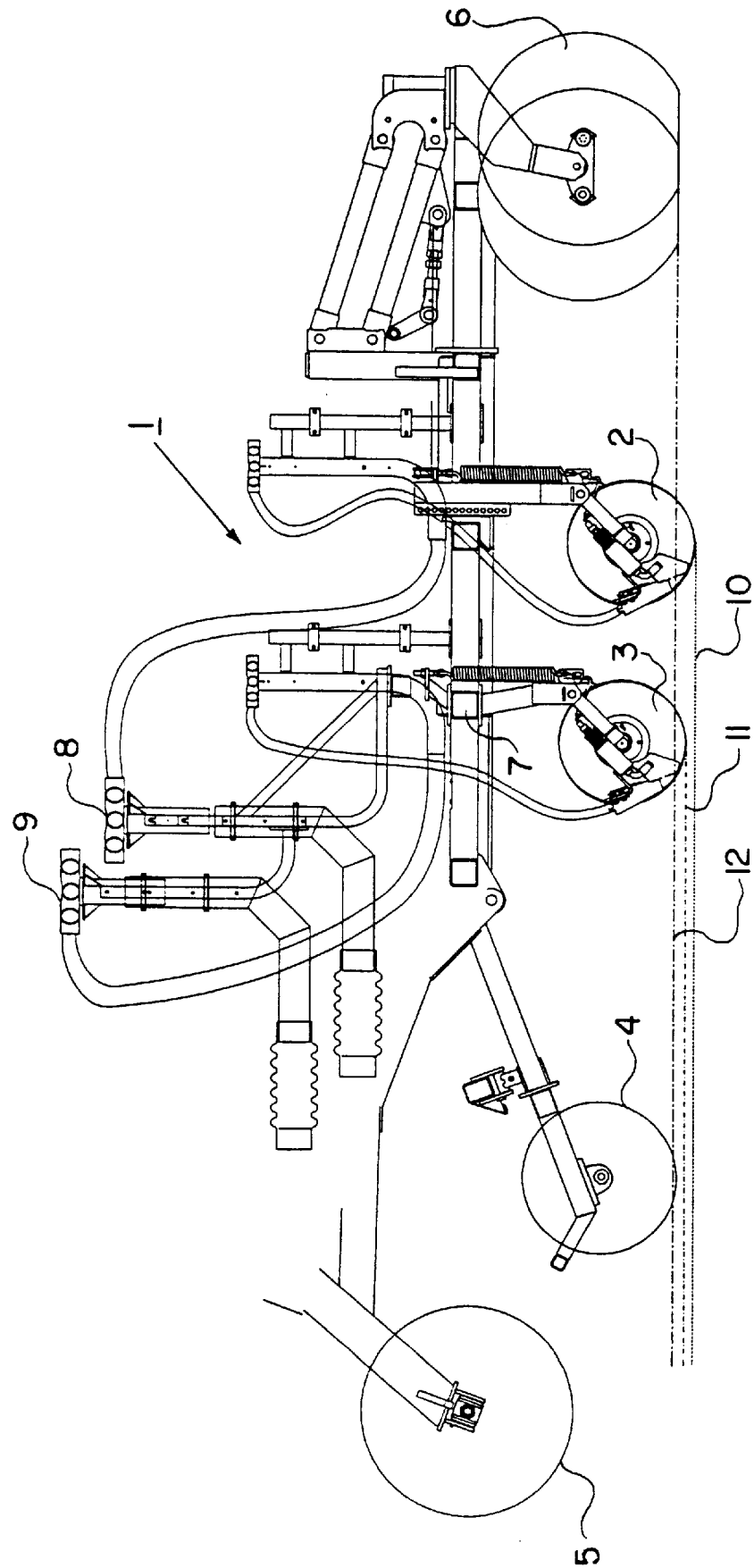
FIG. 1 is a schematic side view of the basic components of the implement of the present invention.

Of particular interest in FIG. 1 is to note that the fertilizer disk coulter creates a mid row 10 at a greater depth than the furrow created by the seed coulter assembly 3, which creates seed row 11. Both are obviously below ground level 12.

Figure 2:
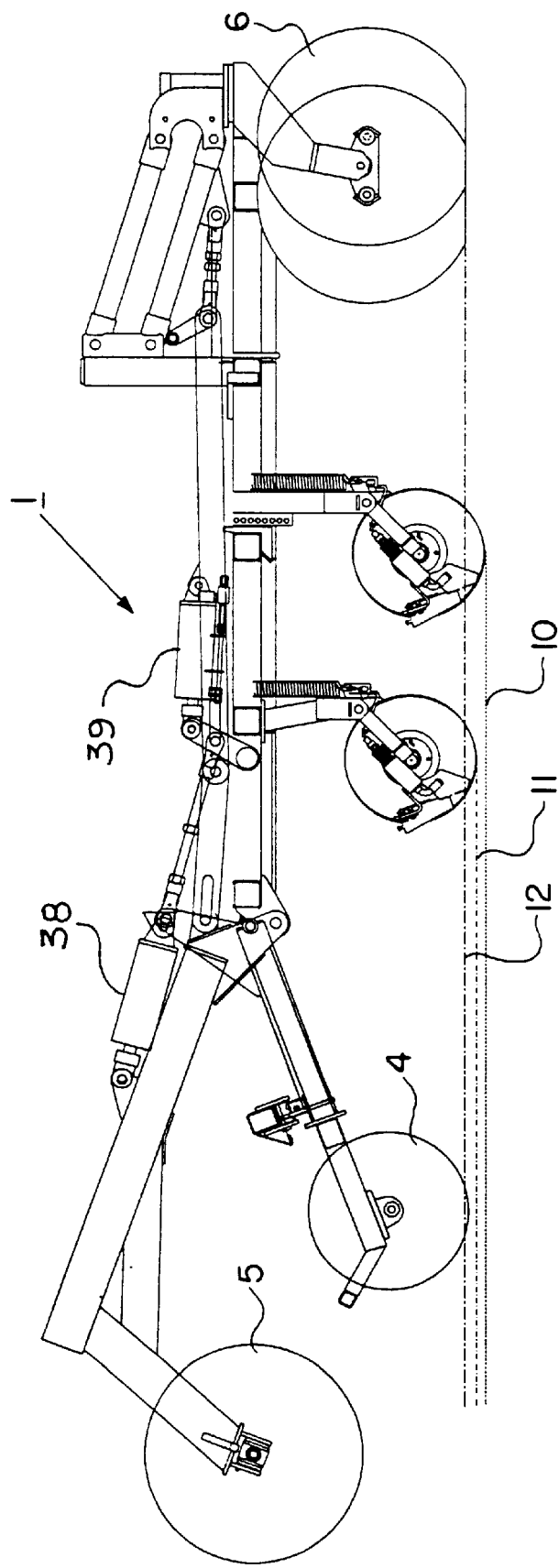
FIG. 2 is a similar side view without the various components necessary for the transfer of seed and fertilizer from the air seeder.

In FIG. 2 one notes how the hydraulics 38, 39 can be used to adjust the frame of the implement 1 such that in FIG. 2, the rear support wheels 5 are off the ground. The height of the coulters and penetration can be controlled by hydraulics 39.

Figure 3:
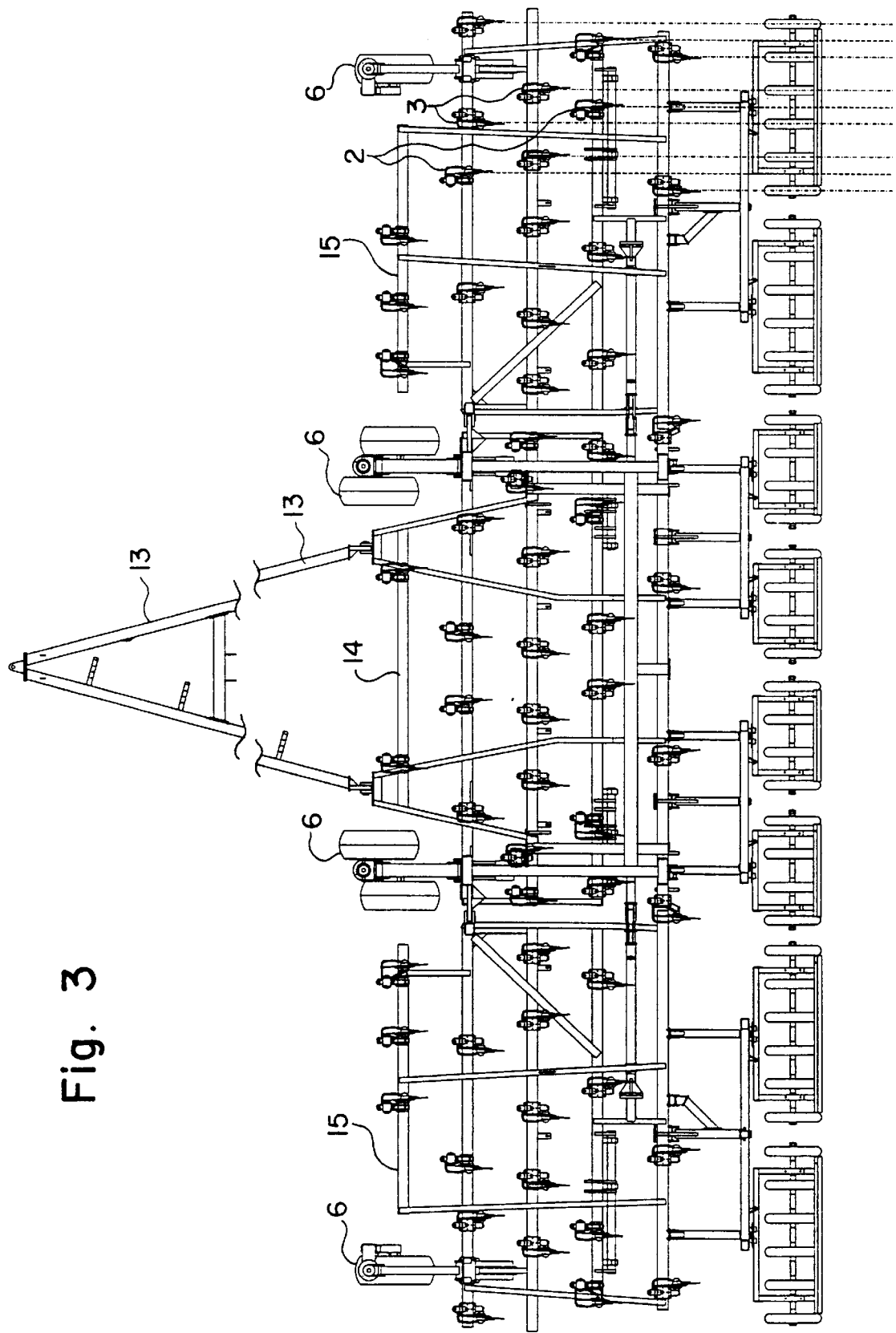
FIG. 3 is a schematic view taken from above of an implement of the present invention.

In FIG. 3, a basic form of an implement used for mid row banding is viewed from above. The coulter disk has a hitch 13, a mid-section 14 and two wing sections 15. However, as previously mentioned, any number of sections can be used. Of particular interest in FIG. 3 is the configuration of the fertilizer disk coulters 2 and the seeder disk coulters 3. One notes that the fertilizer coulters 2 create a furrow and deposit fertilizer mid-way between a pair of seed disk coulters 3. Mid row banding, as termed by the inventor, deposits fertilizer such as nitrogen or anhydrous ammonia a fair distance between the seed furrows such that the seed is not scorched or burnt by the fertilizer. The fertilizer can be gradually used up by the plants during crop emergence and crop establishment.

Figure 4:
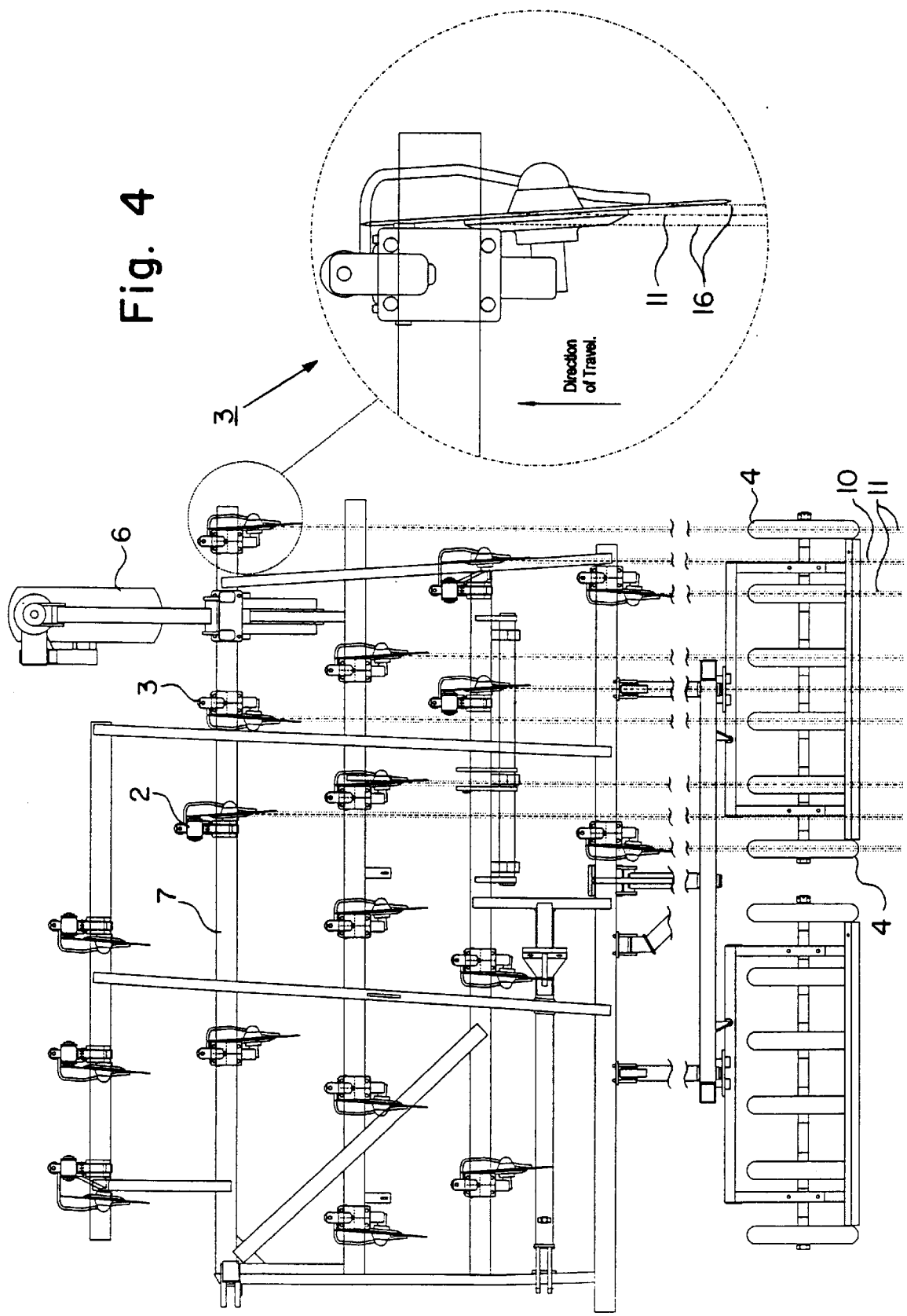
FIG. 4 is a similar view of a portion of the implement of the present invention in greater detail.

In FIG. 4, the fertilizer coulters 2 and seed coulters 3 are fixedly mounted on the horizontal cross frames 7 of the implement 1. One also notes with precision that each of the seed furrows 11 created by seed coulters 3 is followed by a packer wheel 4. It is to be noted in FIG. 4 that the seed and fertilizer coulters 3 and 2 respectively are placed at an acute angle to the direction of travel at approximately 1° to 50°. The edge of the furrow is shown as 16 with the seed being deposited in the seed row 11. This configuration makes a large enough furrow without a great deal of soil disturbance.

Figure 5:
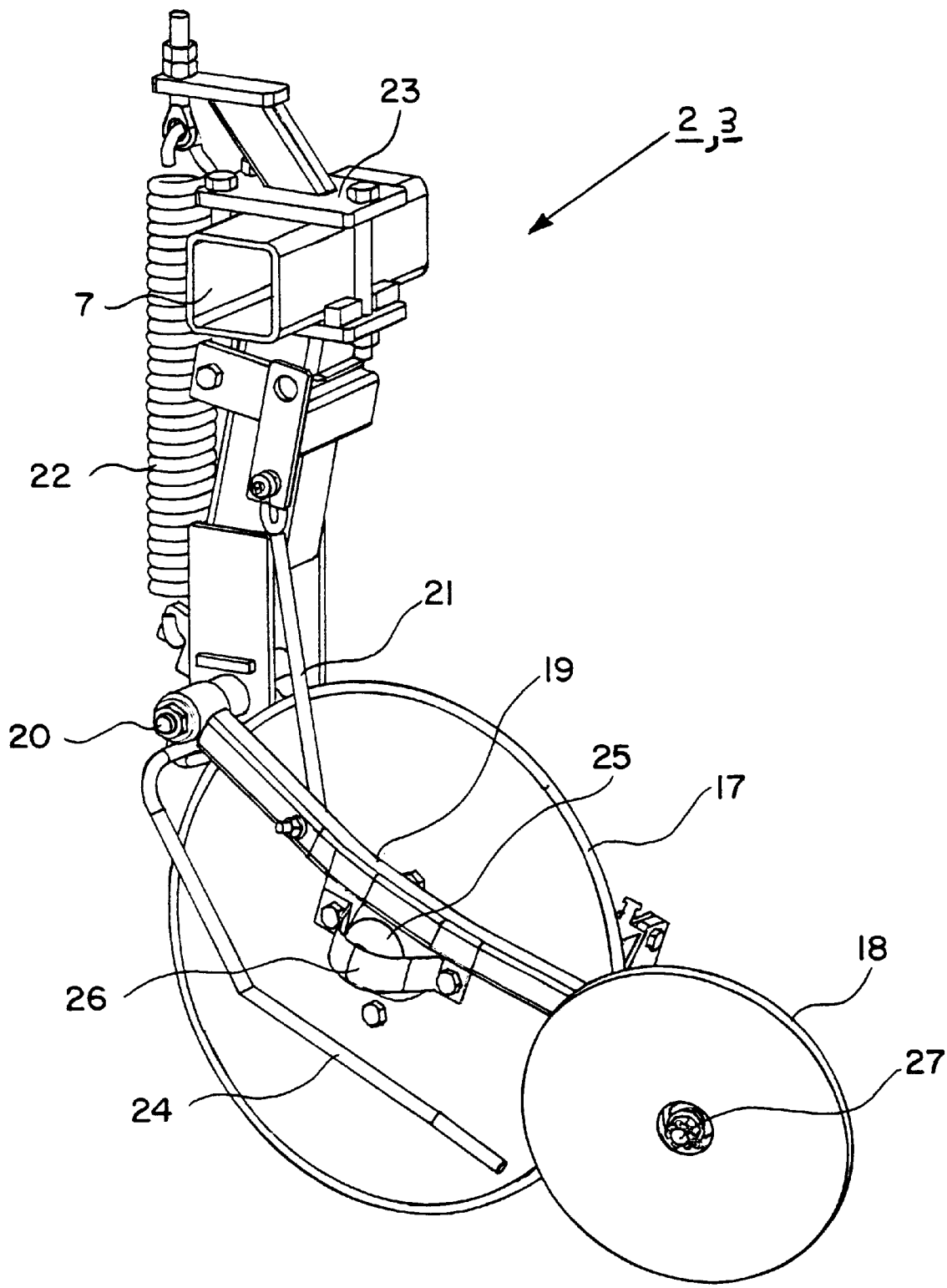
FIG. 5 is a perspective view of the outboard side of the coulter assembly used on the implement of the present invention.

In FIG. 5, a coulter assembly 2 or 3 used for fertilizer or seed respectively is shown. The coulter assembly 2 or 3 mounted on the horizontal frame member 7 comprises a basic coulter disk 17 which is used to cut through the soil and create a furrow followed by a furrow closing wheel 18. Furrow closing wheel 18 follows closely behind coulter disk 17 and is mounted on a furrow closing wheel support arm 19 which is pivotally mounted to the assembly at furrow closing wheel support arm pivot 20. A support cable or chain 21 is adapted to support furrow closing wheel support arm 19 and prevent the furrow closing wheel from descending past the position allowed by the cable or chain such that when the coulter is raised out of the ground the closing wheel too is raised out of contact with the ground. Furrow closing wheel 18 rotates about a furrow closing wheel spindle and bearings shown as 27 in a known manner. Tension spring 22 exerts pressure upon the coulter disk 17 maintaining it in ground penetration. The coulter assemblies 2, 3 are attached to frame member 7 by attachment bracket 23.

Visible in FIG. 5 is an outboard cleaner tine 24 which in operation collect debris such as straw and cleans the soil which accumulates on the outboard side of the coulter. Coulter disk 17 rotates about a spindle (not shown) which is protected by spindle cup seal 25 which in turn is protected by a spindle cup seal protector 26. It should be emphasized that furrow closing wheels 18 are particularly important for seed coulters 3, but may not be necessary when used with fertilizer coulters 2. However, when anhydrous ammonia in its gaseous form is used as fertilizer, it is preferable to have a furrow closing wheel 18 to seal in anhydrous ammonia.

Figure 6:
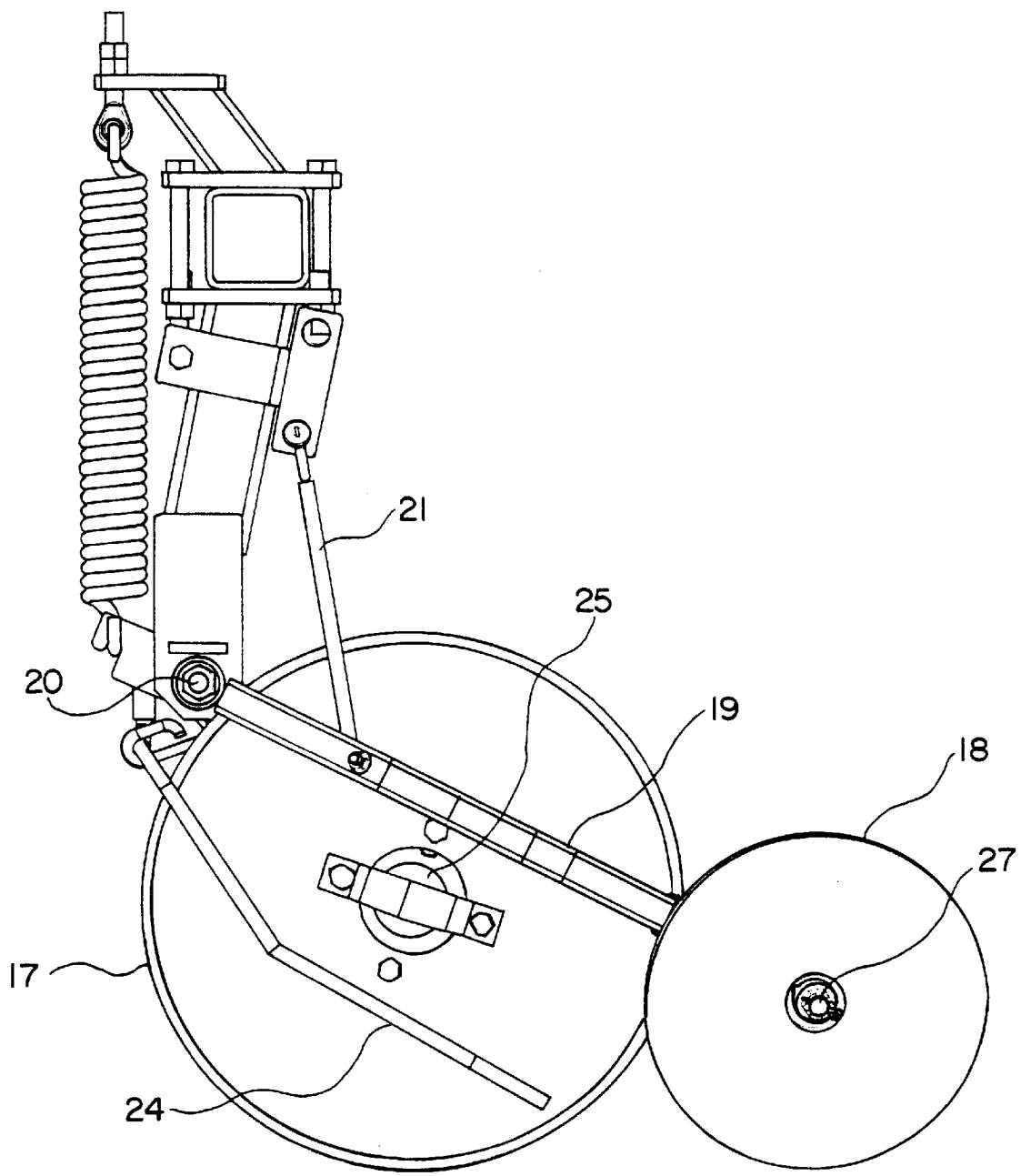
FIG. 6 is a side view of the outboard side of the same disk coulter assembly shown in FIG. 5.

FIG. 6 is a side view of the embodiment shown in FIG. 5.

Figure 7:
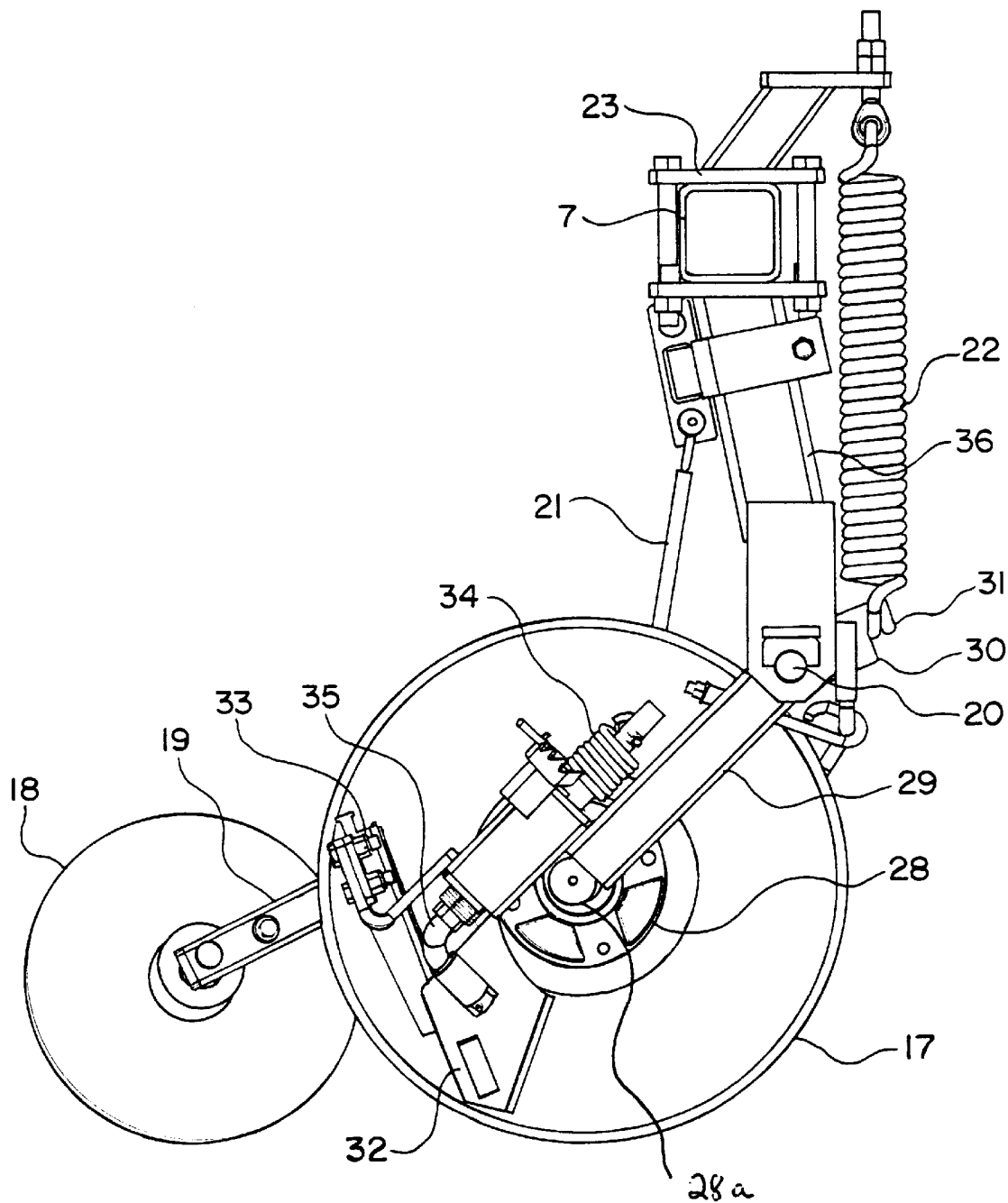
FIG. 7 is a side view of the inboard side of a coulter assembly used with present invention.

FIG. 7 is a side view of the disk coulter assembly viewed from the inboard side. Coulter disk 17 is attached to a hub 28 which rotates about a spindle 28a. The spindle is attached to an inboard strut 29 which is fixedly attached to an outboard strut 30. Outboard strut 30 has a hook 31 which secures the bottom end of spring 22. As previously mentioned spring 22 through tension, keeps coulter 17 in ground penetration.

The inboard side of coulter 17 is equipped with a scraper 32 and a fertilizer or seed deposit boot 33. The latter is used to deposit seed or fertilizer in the furrow created by coulter 17 and is attached to a hose which leads from an air seeder cart (not shown). Scraper 32 is attached to a torque transmitting arm 35 which is tensioned by a scraper tension spring 34. Struts 29 and 30 are pivotally mounted at point 20 along with furrow closer wheel 18 to the upper mounting bracket 36.

Figure 8:
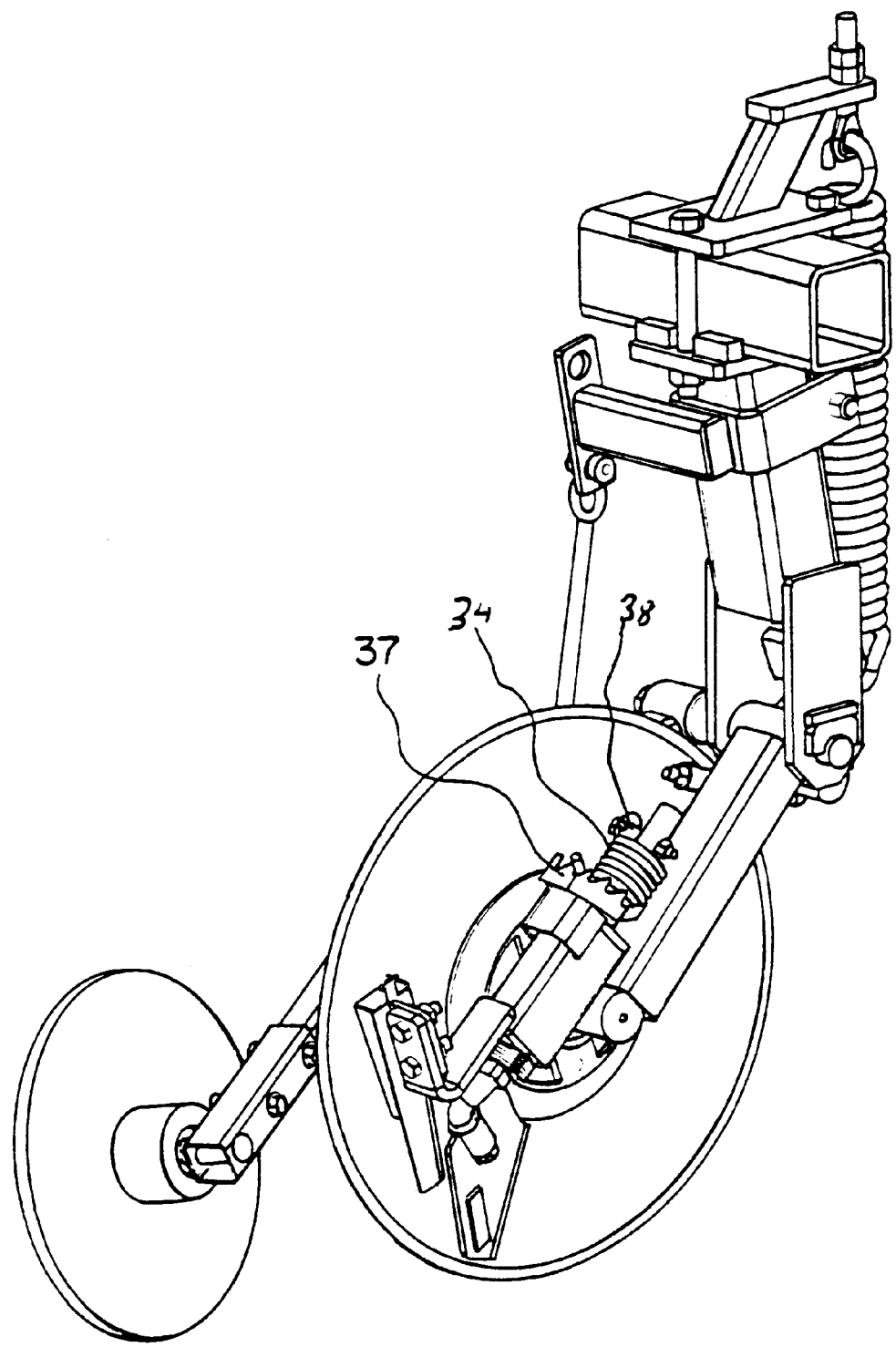
FIG. 8 is a prospective view of the coulter assembly shown in FIG. 7.

As shown more clearly in FIG. 8, a scraper torsion spring 34 is secured in position by an adjustable torsion spring holder 37 and bolt 38.

Figure 9:
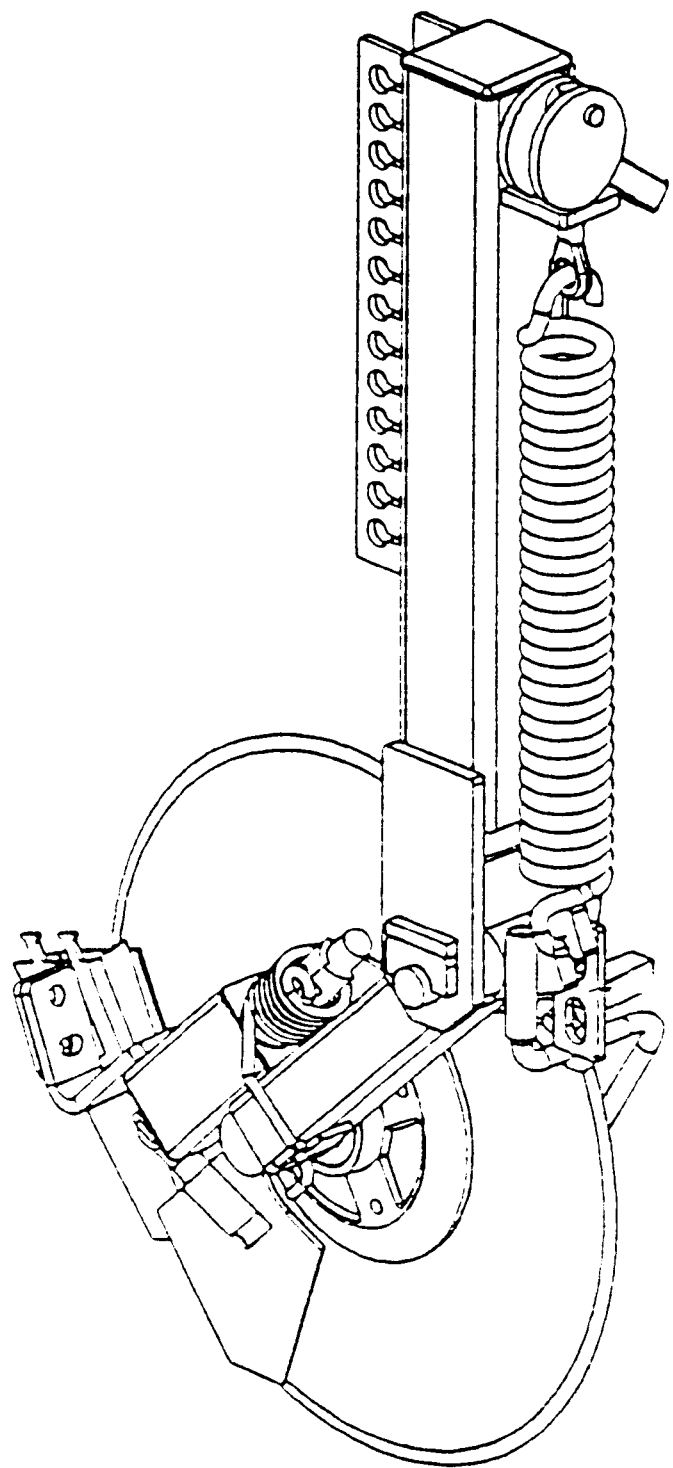
FIG. 9 is a prospective view of an alternative coulter without the closing wheel which can be used with the present invention for fertilizer only.

In FIG. 9, a coulter assembly is shown, however, it is to be noted there is no closer wheel 18. The coulter assembly shown in FIG. 9 can be used to deposit granular or liquid fertilizer which does not require a furrow closer wheel. This assembly allows an operator to change the depth at which the fertilizer coulters penetrate the soil independently of the depth at which the seed coulters penetrate the soil.

What is claimed is:

1. A farm implement adapted to deposit seed and fertilizer in soil and be pulled by a power source comprising:
   a framed cart supported at least by front support wheels and rear packer wheels;
   said cart including a plurality of horizontal frame members extending perpendicular to the line of travel;
   a plurality of seed depositing coulter disc assemblies and a plurality of fertilizer depositing coulter disc assemblies mounted on said frame members;
   each of said coulter disc assemblies comprising a single coulter disc adapted to rotate at an acute angle to the line of travel wherein in operation each coulter disc assembly creates a single furrow;
   each of said fertilizer depositing coulter disc assemblies being mounted midway between seed depositing coulter disc assemblies, such that in operation a row of fertilizer is deposited equidistant between two rows of deposited seed.

2. A fann implement as claimed in claim 1 wherein each of said fertilizer depositing coulter disc assemblies is mounted mid-way between adjacent seed depositing coulter disc assemblies, such that in operation a row of fertilizer is deposited midway between two rows of deposited seed, such that each seed row has access to fertilizer in two opposite directions.

3. A farm implement as claimed in claim 1 wherein each of said fertilizer depositing coulter disc assemblies is mounted mid-way between a pair of seed depositing coulter disc assemblies, such that in operation a row of fertilizer is deposited midway between two rows of deposited seed;
   such that each seed row has access to fertilizer in one direction.

4. An implement as claimed in claim 1 wherein each of said seed depositing coulter disc assemblies includes a furrow closing disc;
   each of said furrow closing discs being pivotally attached to one of said assemblies and being adapted to rotate at the rear thereof at an acute angle to the direction of forward travel and thereby cover in operation a furrow, created by said coulter disc, with soil: each of said packer wheels being in register with a single seed row created in operation by one of said seed depositing coulter disc assemblies.

5. An implement as claimed in claim 4 wherein said furrow closing disc is rotatably mounted on a spindle attached to a remote end of a furrow closing disc support ann; and an opposite end of said furrow closing disc support arm is pivotally connected to a lower end of a mounting bracket of said seed depositing coulter disc assembly.

6. An implement as claimed in claim 5 wherein said furrow closing wheel support arm is connected to an upper portion of said mounting bracket by a support means such as an arm cable, or chain.

7. An implement as claimed in claim 1 wherein each of said fertilizer depositing coulter disc assemblies includes a furrow closing disc;
   each of said furrow closing discs being pivotally attached to one of said assemblies and being adapted to rotate at the rear thereof at an acute angle to the direction of forward travel and thereby cover in operation a furrow created by said coulter disc with soil.

8. An implement as claimed in claim 1 wherein each of said single coulter discs of said fertilizer depositing and seed depositing coulter disc assemblies rotate at an angle of 1° to 7° from the direction of travel.

9. An implement as claimed in claim 1 wherein said coulter disc assemblies include an outboard floating tine and an inboard scraper;
   said tine and said scraper being adapted in operation to clean an outboard planar side of said single coulter disc, and an inboard planar side of said single coulter disc, respectively.

10. An implement as claimed in claim 1 wherein each of said coulter disk assemblies is biased downwardly by a spring.

11. An implement as claimed in claim 1 wherein said implement includes hydraulically operated rear support wheels such that in transport operation said rear support wheels are moved downwardly thereby raising said coulter disc assemblies out of contact with the ground.

12. A method of seeding and fertilizing a field comprising the steps of:
   (1) positioning a plurality of single seed depositing and fertilizer depositing coulter discs adapted to rotate at an acute angle to the forward direction of travel along horizontally disposed frame members of a tool bar, such that each fertilizer depositing coulter disc is located mid-way between a pair of seed depositing coulter discs;
   (2) connecting said seed depositing coulter discs and said fertilizer depositing coulter discs to a seed container and a fertilizer container respectively on an air seeder cart with a plurality of hoses or tubes;
   (3) pulling said tool bar forwardly and creating a series of pairs of seeded furows, each pair of seeded furrows having a single fertilizer furrow mid-way therebetween;
   (4) covering each seed furrow with soil with a furrow closing disc adapted to rotate at an acute angle to the direction of forward travel; and
   (5) packing each seeded furrow with a packer wheel.

13. An agricultural disc coulter seeding implement intended to be towed behind an agricultural tractor across agricultural fields including:
   a) a hitch;
   b) said hitch attached to a lattice type frame;
   c) wheels for supporting said lattice frame;
   d) hydraulic means for changing the height above the ground of said lattice frame;
   e) seed disc coulter assemblies comprising a single coulter disc rigidly attached to said lattice frame and primarily used for receiving and depositing seed;

f) fertilizer disc coulter assemblies comprising a single coulter disc rigidly attached to said lattice frame and primarily used for receiving and depositing fertilizer;

g) said seed disc coulter assemblies creating furrows in the soil for allowing the entry of seed into the soil;

h) closer discs located behind said seed disc coulter assemblies used to push soil over said seed furrows;

i) packer wheels located behind said seed disc coulter assemblies and also behind said closer discs located behind said seed disc coulter disc assemblies;

j) means for supplying seed to said seed disc coulter assemblies; and k) means for supplying fertilizer to said fertilizer disc coulter assemblies.

14. A disc coulter seeding implement as in claim 13 where said coulter discs rotate at an acute angle to the direction of forward travel.

15. A disk coulter seeding implement as in claim 13 where said disk coulter assemblies each include a spring loaded scraper assembly that keeps a surface of the disk coulter that is facing the furrow being created, clear of soil or debris.

16. A disc coulter seeding implement as in claim 15 where said disc coulter assemblies each include a spring loaded scraper assembly that keeps a surface of the disc coulter facing the furrow being created, clear of soil or debris and a leading edge of said scraper is made from carbide.

17. A disk coulter seeding implement as in claim 15, wherein said spring loaded scraper includes means to quickly vary contact force between said scraper and said disk coulter.

18. A disc coulter seeding implement as in claim 13 where said disc coulter assemblies each include a seed or fertilizer delivery tube on the side of the disc coulter facing the furrow said implement further including a spring loaded scraper assembly which prevents soil from contacting said seed or fertilizer delivery tube.

19. A disk coulter seeding implement as in claim 13 where said seed depositing disk coulter assemblies include a mounting bracket, a strut, means for pivotally connecting said strut to said mounting bracket, a two sided disk rotatably attached to said strut, a resilient means connecting said strut to said mounting bracket such that when said disk encounters an obstacle said disk will rotate upwardly without damage.

20. A disk coulter seeding implement as in claim 13 where said fertilizer depositing disk coulter assemblies include a mounting bracket, a strut, means for pivotally connecting said strut to said mounting bracket, a two sided disk rotatably attached to said strut, a resilient means connecting said strut to said mounting bracket such that when said disk encounters an obstacle said disk will rotate upwardly without damage.

21. A disk coulter seeding implement as in claim 13 where said seed depositing disk coulter assemblies include a mounting bracket, a strut, means for pivotally connecting said strut to said mounting bracket, a two sided disk rotatably attached to said strut, a resilient means connecting said strut to said mounting bracket, a tine attached to said strut and extending across at least one side of the disk; said tine being adapted to collect organic material to form a wear pad and thereby remove soil build-up and avoid wear on said disk and tine.

22. A disk coulter seeding implement as in claim 13 where said fertilizer depositing disk coulter assemblies include a mounting bracket, a strut, means for pivotally connecting said strut to said mounting bracket, a two sided disk rotatably attached to said strut, a resilient means connecting said strut to said mounting bracket, a tine attaching to said strut and extending across at least one side of the disk; said tine being adapted to collect organic material to form a wear pad and thereby remove soil build-up and avoid wear on said disk and tine.

23. A disc coulter seeding implement as in claim 13 where said seed depositing disc coulter assemblies include furrow closing discs. adapted in operation to rotate at an acute angle to the line of travel, pivotally attached to said seed depositing disc coulter assemblies such that when said furrow closing discs encounter an obstacle movement upwardly occurs without damage.

24. A disc coulter seeding implement as in claim 13 wherein when said fertilizer depositing disc coulter assemblies include furrow closing discs pivotally attached to said fertilizer disc coulter assemblies such that when said furrow closing discs encounter an obstacle they can move upwardly without damage.

* * * * *